March 12, 1929.　　A. G. CHAPMAN　　1,704,786

CROSS TALK METER

Filed Sept. 23, 1925　　2 Sheets-Sheet 1

INVENTOR
A. G. Chapman
BY
ATTORNEY

Patented Mar. 12, 1929.

1,704,786

UNITED STATES PATENT OFFICE.

ARTHUR G. CHAPMAN, OF EAST ORANGE, NEW JERSEY, ASSIGNOR TO AMERICAN TELEPHONE AND TELEGRAPH COMPANY, A CORPORATION OF NEW YORK.

CROSS-TALK METER.

Application filed September 23, 1925. Serial No. 58,204.

This invention relates to universal shunts and particularly to a form of shunt known as a crosstalk meter so designed and proportioned as to have substantially uniform accuracy throughout the entire range of measurement.

As is well known to those skilled in the art, a crosstalk meter is a form of universal shunt calibrated in terms of crosstalk units and employed in measuring the magnitude of the crosstalk between two signaling circuits. A crosstalk meter may be regarded as a network of variable loss, the scale of which is calibrated to indicate the ratio of the output current to the input current, when the impedance of the detector or indicating device connected with its output terminals is equal to the input impedance of the network. Since, by the nature of the subject matter, the current ratios in crosstalk measurements are very small, the input impedance of the meter is practically independent of the output current.

In the ordinary form of crosstalk meter the output current is practically proportional to that portion of the variable shunt resistance across which the output circuit is bridged. If the variable resistance is constructed in the form of a slide wire and marked with a scale indicating the current ratio, this scale would be practically linear if the resistance of the slide wire varies directly as its length. One of the inherent defects is a crosstalk meter based upon a linear scale is that the readings are not sufficiently accurate for the smaller ratios and have an unnecessarily high degree of accuracy for the larger ratios, that is to say, it is lacking in uniform accuracy throughout its range of measurement.

This invention resides in a crosstalk meter so proportioned and designed as to have substantially uniform accuracy throughout its entire range of measurement. This result is obtained by proportioning the variable shunt and series resistances to obtain a nonlinear scale. Specifically two shunted slide wires are adjusted simultaneously. While a single slide wire connected in the usual way would give a linear scale, the two slide wires in conjunction with variable series resistance interposed between them give approximately a squared scale.

Figure 1:
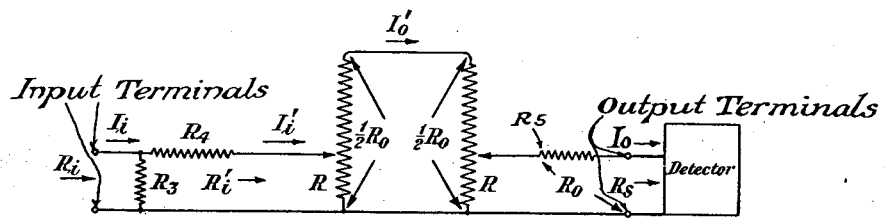
Figure 2:
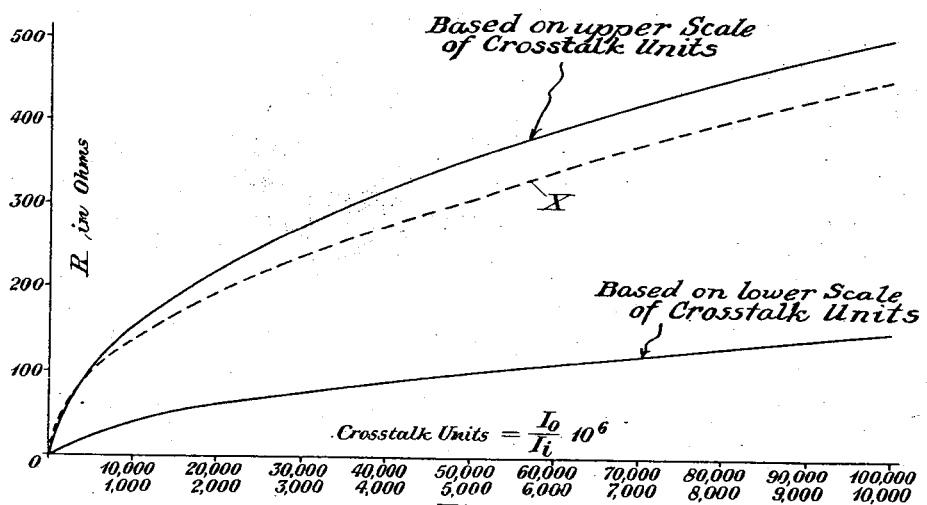
Figure 3:
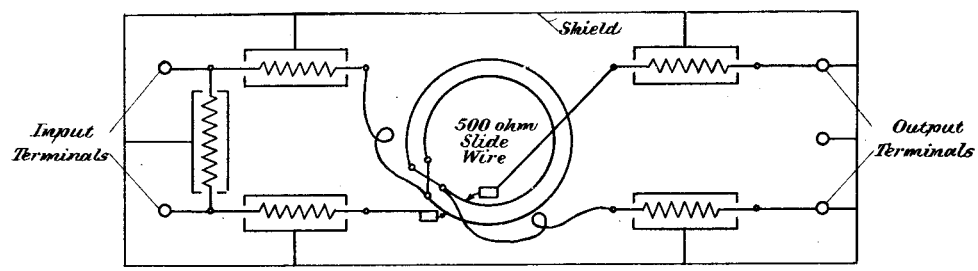
Figure 4:
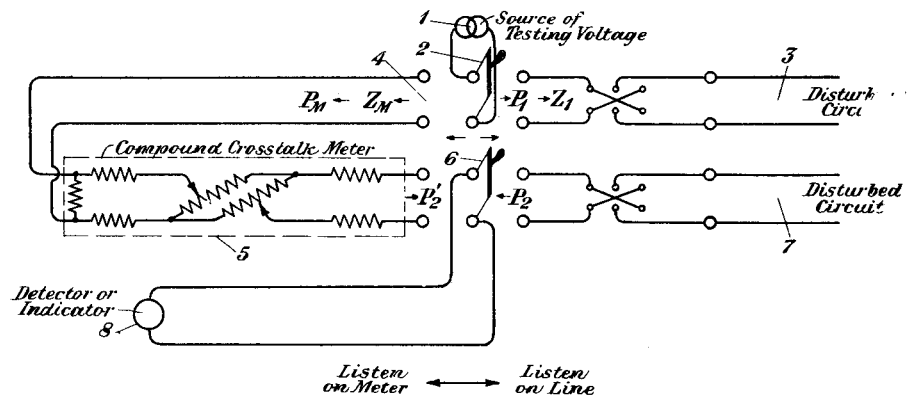

This invention will be clearly understood from the following description when read in connection with the attached drawing, of which Figure 1 shows schematically a circuit embodying the principle underlying the invention, Fig. 2 shows curves illustrating the principle, Fig. 3 is a working diagram of a practical form of crosstalk meter, Fig. 3ª is a schematic drawing of the circuit shown in Fig. 3, and Fig. 4 shows the circuit arrangement for measuring crosstalk in which a crosstalk meter of the type shown in Fig. 3 is employed.

It may be desirable to point out that in a crosstalk measuring system, such as is disclosed in Fig. 4, the source of testing voltage is first connected with the disturbing circuit and the detector with the disturbed circuit. If we represent by $I_i$ the current that flows into the disturbing circuit whose impedance is $R_i$, the power equals $I^2_i R_i$. Similarly if $I_o$ represents the crosstalk current that flows into the detector whose impedance equals $R_s$, the power representing crosstalk going into the detector equals $I^2_o R_s$. The measure of the crosstalk is the ratio of such powers, viz:

$$\frac{I^2_o R_s}{I^2_i R_i}$$

It will be apparent that if we make the input impedance $R_i$ equal to the output impedance $R_s$ the measure of the crossstalk is simply the ratio of the currents squared. In order to make this measurement, it is necessary to employ another circuit, variable at will, to simulate the crosstalking line circuits. This variable circuit which is the crosstalk meter, is adapted for connection with said source of voltage and also with the detector. When the said meter is adjusted so that the current into the detector is the same as when it is connected with the disturbed line, and if the input impedance of the crosstalk meter is also $R_i$, the meter indicates the magnitude of the crosstalk, because the ratio of $$\frac{I^2_o}{I^2_i}$$

is the same for both circuit conditions.

In Fig. 1, $R_i$ represents the impedance at the input of the crosstalk meter which is connected or is adapted for connection with a source such as 1 in Fig. 4 which delivers to the meter an input current $I_i$. The resistances $R_3$ and $R_4$ connected in shunt and series respectively are necessary in order to make the input impedance of the crosstalk meter practically constant and equal to that of the detector or indicating device connected with the output side of the meter. One of the variable shunt resistances, indicated by $$\frac{R_o}{2},$$

is connected with what may be termed the input side of the meter and the other with its output side. $R$ indicates the portion of the variable resistance $R_o$ across which the input or output circuit is connected. A detector whose impedance is equal to a resistance $R_s$ is connected to the output terminals of the crosstalk meter. Between the detector and the last slide wire resistance is connected a series resistance $R_5$ the purpose of which is to make the resistance connected across the slide wire, equal to $R_o$ which is twice the slide wire resistance. This ratio should be fairly large and is made two to one for convenience. Such series resistance would be unnecessary if the resistance of the slide wire could conveniently be made one half of $R_s$.

Therefore the resistance $$R_o = R_5 + R_s \quad (1)$$

The input impedance to the network, namely, the resistance $R_i$, must approximately equal the impedance of the detector, namely, the resistance $R_s$, because the input impedance of the wire circuits whose crosstalk is to be measured is approximately equal to the resistance $R_s$. In order that $R_i$ shall nearly equal $R_s$ the following relation should be satisfied:

$$R_s = \frac{R_3 R_4}{R_3 + R_4} \quad (2)$$

It is also necessary that $R_4$ shall be large in comparison with $.2R_o$. This last requirement will be apparent if we consider the following equation representing the impedance looking into the slide wire resistances which impedance is designated $R'_i$.

$$R'_i = \frac{R(R^2_o - 2R^2)}{R^2_o - R^2 + RR_o} \quad (3)$$

$R'_i$ is a minimum when the contact of the left-hand slide wire is at its lowest point; that is to say, when $R = 0$, and it is at its maximum when the said contact is at its uppermost point; that is to say, when $$R = \frac{R_o}{2}$$

minimum value of $$R'_i = 0$$

maximum value of $$R'_i = .2R_o \text{ when } R = \frac{R_o}{2}$$

$$R_i = \frac{R_s \left[1 + \frac{R'_i}{R_4}\right]}{1 + \frac{R'_i}{R_3 + R_4}} \quad (4)$$

It will be seen that if values are chosen for $R_3$, $R_4$, and $R_5$ so as to satisfy Equations (1) and (2), and if $R_4$ is large compared with $.2R_o$, then $R_i$ will approximately equal $R_s$.

The exact proportioning of $R_3$ and $R_4$ depends upon the range of current ratios that it is desired to cover.

The ratio of the output current $I_o$ to the current that is flowing into the slide wire network designated $I'_i$ is represented by $$\frac{I_o}{I'_i} = \frac{I_o}{I'_o} \cdot \frac{I'_o}{I'_i} \quad (5)$$

Substituting for each factor of the right-hand member of the last equation its equivalent, the equation becomes $$\frac{I_o}{I'_i} = \frac{R}{R_o + R} \cdot \frac{R}{R_o - 2R + \frac{RR_o}{R_o + R}} \quad (6)$$

which equals $$\frac{R^2}{R^2_o} \quad (7)$$

if $\frac{R_o}{R}$ is large, and if $R_o = R_5 + R_s$.

From Equation (7) it will be seen that the ratio of the output current to the input current varies about as the ratio of the square of the variable shunt resistance $R$ to the square of the resistance $R_o$.

The ratio of output current to the current input to the crosstalk meter is $$\frac{I_o}{I_i} = \frac{R_3}{R_3 + R_4} \cdot \frac{R^2}{R^2_o + R\left(R_o + \frac{R^2_o}{R_3 + R_4}\right) - R^2 - \frac{2R^3}{R_3 + R_4}} = \frac{R_3}{R_3 + R_4} \cdot \frac{R^2}{R^2_o}$$

if $$\frac{R_o}{R} \text{ and } \frac{R_3 + R_4}{R} \text{ are large.}$$

Figure 3A:
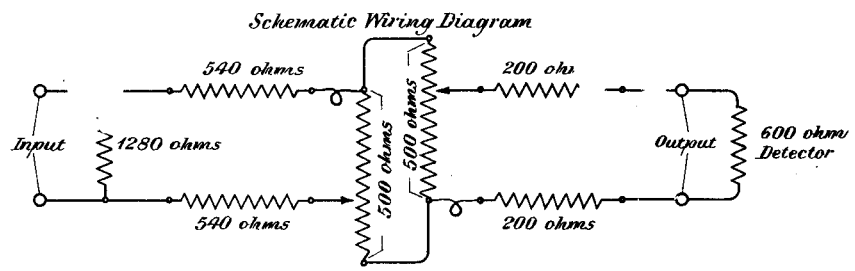

The manner in which a crosstalk meter having a non-linear characteristic is constructed is shown more clearly in Fig. 3, in which the variable shunt resistance comprises two slide wires mounted on a single drum. As will be seen from the schematic diagram shown in Fig. 3a, the crosstalk meter is, in effect, two simple crosstalk meters, each having a series and a shunt resistance and the current ratio varies directly as the shunt resistance, that is, directly with the length of the slide wire. Since the current ratio in each half of the meter shown, for example, in Fig. 3ᵃ varies almost directly as the shunt resistance $R$, the current ratio for what may be termed the compound crosstalk meter varies about as $R^2$. This relation obtains from the method of connecting the two slide wires together. The meter is calibrated from a table relating the values of $R$ with the ratio of $I_o$ to $I_i$ which was calculated from the formula set forth hereinbefore in connection with Fig. 1. The exact relationship between $R$ and current ratio is shown by the solid lines of Fig. 2, the curve designated $X$ represents the approximate squared relation.

It is desirable to point out that in Fig. 1 and in the equations set forth in connection therewith it has been assumed that the two slide wires whose magnitudes are represented as $R_o$ are exactly alike. This is not possible in practice and therefore to calibrate the scale accurately it is necessary to develop a modification of the formula to allow for such difference. This correction can be made with great accuracy by substituting for $R^2$ in the equations the value $R_1 \times R_2$.

It seems desirable to point out that the variable series resistance between the two shunts is important for the larger values of crosstalk. This resistance is $R_o - 2R$. Increasing the shunt resistances increases the output current, but this action is helped along by decreasing the series resistance.

If a fixed series resistance were used, say $R_6$, the formula for $$\frac{I_o}{I'_i}$$

would be $$\frac{R}{R_o+R} \cdot \frac{R}{R_6+R+\frac{RR_o}{R+R_o}}$$

The denominator increases with $R$ and therefore the ratio cannot increase as $R^2$. This is largely offset by decreasing $R_6$ as $R$ increases.

The manner in which the crosstalk meter is employed is shown clearly in Fig. 4, in which the source of sinusoidal voltage 1 is connected with the middle contacts of the switch 2 so that this source may be connected either with the disturbing circuit 3 or with the input side 4 of the crosstalk meter 5. The output side of the crosstalk meter is connected with one set of contacts of the switch 6, while the disturbed circuit 7 is similarly connected with other contacts of this switch. The middle contacts of this switch are connected with a detector or indicating device 8. The manner in which this circuit is manipulated for measuring crosstalk is as follows: The switches 2 and 6 are first thrown in the right-hand direction so as to connect the source 1 with the disturbing circuit 3 and the disturbed circuit 7 with the detector or indicator 8. An indication of the magnitude of the crosstalk current is obtained. The switches are then thrown in the left-hand direction so as to connect the source 1 with the input side of the crosstalk meter 5 and to connect the output side of this meter with the detector 8. The variable shunt resistance of the meter as represented by the slide wires of Fig. 3 are manipulated so that the current indicated by the detector or indicator 8 approximates the current set up therein when the source 1 is connected with the disturbing circuit 3 and the detector 8 is connected with the disturbed circuit 7, that is to say, the power $P_2$ from the disturbed circuit is made equal to the power $P_2'$ of the output of the meter. The reading of the meter is an indication of the square root of the ratio of $P_2'$ to $P_M$, that is to say, the ratio of the output current of the meter to the input current. The ratio in which we are finally interested is that of $$\sqrt{P_2} \text{ to } \sqrt{P_1},$$

namely, the square root of the ratio of the crosstalk power to the power in the disturbing circuit. The reading of the crosstalk meter 5 is, however, an indication of this ratio if the impedance of the input circuit of the crosstalk meter, that is, $Z_M$, is equal to the impedance $Z_1$ of the disturbing circuit.

While this invention has been disclosed as embodied in a circuit employing two slide wire resistances it is to be understood that it is capable of embodiment in other forms without departing from the spirit and scope of the appended claims.

What is claimed is:

1. A crosstalk meter comprising two simple slide wires, each arranged to vary directly the series and shunt resistance of the meter so that the ratio of the output current to the input current of the said meter varies as the square of the shunt resistance.

2. The combination with a crosstalk meter of an output circuit connected therewith, the said meter comprising a series resistance and a shunt resistance across its input side so proportioned as to render the impedance of the input side practically constant and equal to that of the output circuit, and a plurality of variable shunt and series resistances, each consisting of a slide wire and each so designed as to operate simultaneously so that the ratio of the output to the input current increases more rapidly than the first power of the magnitude of the shunt resistance.

3. The combination with a crosstalk meter comprising a plurality of slide wires having means for their simultaneous variation, the said wires being so connected as to vary the series and shunt resistance of the said meter, a source of voltage, a resistance network connected between the said source and the said meter, and an indicating device connected across the output of the said meter, the said network being so proportioned that the input impedance across the said network equals that of the indicating device.

4. A crosstalk meter comprising a plurality of variable series resistances and a plurality of variable shunt resistances, all of said resistances being formed by a plurality of slide wire resistances, each slide wire being so arranged that its variation simultaneously changes the magnitude of the series resistance and shunt resistance formed by the said slide wire resistance, the said slide wire resistances being so arranged that the ratio of the output current to the input current increases more rapidly than the first power of the magnitude of the shunt resistance.

In testimony whereof, I have signed my name to this specification this 22nd day of September, 1925.

ARTHUR G. CHAPMAN.